(12) United States Patent
McLellan et al.

(10) Patent No.: US 7,769,011 B1
(45) Date of Patent: Aug. 3, 2010

(54) METHOD AND SYSTEM FOR AUTOMATICALLY REQUESTING, GENERATING AND MAINTAINING ATM ADDRESSES

(75) Inventors: Lisa Kay McLellan, Belton, MO (US); Jennifer Susan Istok, Orlando, FL (US); Deborah Maria Robinson, Mansfield, OH (US); Mary ("Cathy") Brown Etheridge, Tarboro, NC (US); Richard Charles Glover, Overland Park, KS (US); David Eugene Maas, Olathe, KS (US); Dana Darlene Liston, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1654 days.

(21) Appl. No.: 10/746,983

(22) Filed: Dec. 24, 2003

(51) Int. Cl.
*H04L 12/28* (2006.01)
(52) U.S. Cl. .................... 370/392; 370/395.1
(58) Field of Classification Search ........ None
See application file for complete search history.

(56) References Cited

U.S. PATENT DOCUMENTS

| | | | | | |
|---|---|---|---|---|---|
| 5,392,402 | A | * | 2/1995 | Robrock, II | 709/227 |
| 5,481,544 | A | * | 1/1996 | Baldwin et al. | 370/392 |
| 5,517,617 | A | * | 5/1996 | Sathaye et al. | 709/222 |
| 5,828,844 | A | * | 10/1998 | Civanlar et al. | 709/228 |
| 6,021,263 | A | * | 2/2000 | Kujoory et al. | 709/232 |
| 6,047,329 | A | * | 4/2000 | Horikawa et al. | 709/238 |
| 6,363,411 | B1 | * | 3/2002 | Dugan et al. | 709/202 |
| 6,597,689 | B1 | * | 7/2003 | Chiu et al. | 370/354 |
| 6,603,764 | B1 | * | 8/2003 | Epley | 370/395.1 |
| 6,662,208 | B1 | * | 12/2003 | Moeller et al. | 709/203 |
| 6,665,730 | B1 | * | 12/2003 | Michelson et al. | 709/238 |
| 6,671,699 | B1 | * | 12/2003 | Black et al. | 707/201 |
| 6,732,181 | B2 | * | 5/2004 | Lim et al. | 709/229 |
| 6,741,599 | B1 | * | 5/2004 | Dunn et al. | 370/395.6 |
| 6,785,279 | B1 | * | 8/2004 | Crooks | 370/392 |
| 6,791,943 | B1 | * | 9/2004 | Reynolds | 370/232 |
| 6,862,284 | B1 | * | 3/2005 | Spiegel et al. | 370/395.1 |
| 7,313,154 | B2 | * | 12/2007 | Day et al. | 370/477 |
| 2002/0001307 | A1 | * | 1/2002 | Nguyen et al. | 370/386 |
| 2002/0029168 | A1 | * | 3/2002 | McConnell et al. | 705/26 |
| 2003/0115303 | A1 | * | 6/2003 | Marian et al. | 709/222 |
| 2004/0088735 | A1 | * | 5/2004 | Kristofek | 725/118 |

OTHER PUBLICATIONS

Harwood, A. Hong Shen, Flow generation for IP/ATM label-switched routing over random networks, Apr. 23, 2001, IEEE, 15th International Parallel and Distributed Processing Symposium, Proceedings, pp. 1-6.*

* cited by examiner

*Primary Examiner*—Jayanti K Patel
*Assistant Examiner*—Hooman Houshmand
(74) *Attorney, Agent, or Firm*—Matthew P. Harlow

(57) ABSTRACT

A method and system for automatically generating and maintaining Asynchronous Transfer Mode (ATM) addresses is provided. The method includes receiving a request from a requestor that includes an element identifier corresponding to a network element to be ultimately associated with the ATM address, validating the request, providing a unique identifier that corresponds to the network element, grouping the unique identifier with a set of parameters to create the ATM address without user intervention, and storing the ATM address in a repository. The system includes a Graphical User Interface (GUI) for receiving one or more parameters to be used to generate the ATM address and a set of computer-useable instructions accessible by the GUI that perform a method for generating the ATM address without user intervention based in part on the one or more parameters.

14 Claims, 14 Drawing Sheets

FIG. 4G

CODARS ATM Address Application
ATM Report By Order Number

ATM type: PUBLIC

Region: --ALL--

COMPANY: --ALL--

Order Number: 0011158447

ATM Status: --ALL--

Want EMAIL: NO

Submit

Back

Main Menu

*FIG. 4I*

CODARS ATM APPLICATION
ATM Address Report

| Request-Date | Company-ID | Region | Order-Number | Call-Server-CLLI-Code | Element-Location-CLLI-Code | Element-Name |
|---|---|---|---|---|---|---|
| 08/15/2002 | 27 | SOUTHERN | N000444111 | FTWBFLXAGNX | FTWBFLXADS0 | PP15000 |
| 08/16/2002 | 27 | SOUTHERN | A000111333 | FTWBFLXAGNX | SNRSFLXARS0 | PP15000 |
| 08/16/2002 | 27 | SOUTHERN | B000111333 | TLHSFLXAGNX | TLHSFLXADS1 | MG9000 |
| 08/16/2002 | 39 | SOUTHERN | C000111333 | ALSPFLXAGNX | ALSPFLXADS0 | PP19000 |
| 08/16/2002 | 27 | SOUTHERN | E000111333 | FTWBFLXAGNX | FTWBFLXADS0 | MG9000 |
| 08/16/2002 | 27 | SOUTHERN | F000111333 | FTWBFLXAGNX | FTWBFLXADS0 | MG9000 |
| 08/16/2002 | 27 | SOUTHERN | G000111333 | FTWBFLXAGNX | SNRSFLXARS0 | MG9000 |
| 08/16/2002 | 27 | SOUTHERN | H000111333 | FTWBFLXAGNX | SNRSFLXARS0 | PP15000 |
| 08/16/2002 | 27 | SOUTHERN | I000111333 | FTWBFLXAGNX | SNRSFLXARS0 | MG9000 |
| 08/16/2002 | 27 | SOUTHERN | J000111333 | FTWBFLXAGNX | SNRSFLXARS0 | MG9000 |

*FIG. 4K*

METHOD AND SYSTEM FOR AUTOMATICALLY REQUESTING, GENERATING AND MAINTAINING ATM ADDRESSES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of automatically generating and maintaining ATM addresses for use in a communications networking environment.

BACKGROUND OF THE INVENTION

Asynchronous Transfer Mode, or "ATM," is a protocol used to communicate data in a packet-based network. Particular challenges surround employing ATM to communicate voice information in a packet-based network utilizing ATM technology. Each element involved must be associated with a unique ATM address. If multiple devices have the same ATM address, network failures occur. The negative effects that flow from network failures abound. Two exemplary consequences of network failures include data being routed to the wrong location or data not being routed at all.

Historically, generating and tracking ATM addresses has been a difficult task. ATM addresses were manually generated by hand. But manually conceiving ATM addresses increases the probability of address duplication because there is no robust way to ensure that a created address is unique. Moreover, the probability of errors in address creation is relatively high in a manual process. Typically, an ATM address is 160 bits long. Accurately configuring all 160 bits manually requires is burdensome and resource intensive. After ATM addresses are created, it is desirous to store them.

A popular prior technique for storing ATM addresses was to type them into a local spreadsheet. Merely attempting to store manually generated ATM address in a spreadsheet, however, offers no validation, is subject to data-entry errors, and does not practically allow multiple users to access current ATM addresses or input new ones.

As networks grow in complexity, so too does the need for a system and method that automatically generates and maintains ATM addresses. The prior art does not offer a method or system that automatically generates ATM addresses to be used in connection with a communications network. A need exists for a system that ensures unique addresses will be respectively assigned to one and only one network element. A further shortcoming of the prior art is that no scheme is available that provides a centralized access point that can be used to request, obtain, and view ATM addresses. The prior art could be still further improved by providing validation and security functionality to help ensure that proper ATM addresses are generated and assigned. Finally, the prior art offers no mechanism to notify desired persons or entities of ATM addresses incident to origination.

SUMMARY OF THE INVENTION

The present invention solves at least the above problems by providing a method and system for automatically generating and maintaining ATM addresses. The present invention has several practical applications in the technical arts including reducing the resources necessary to generate ATM addresses, providing a centralized data store to house the ATM addresses that is widely accessible by multiple simultaneous users, preventing an ATM addresses from being associated with more than one network element, automatically notifying one or more recipients of the ATM address, and validating that an ATM address is properly generated.

In a first aspect, the presenting invention includes one or more computer-readable media having computer-useable instructions embodied thereon for performing a method for generating an ATM address. The method includes receiving a first set of data parameters, issuing a query based on the data parameters that enables a unique communications-element identifier to be generated, generating the unique communications-element identifier without user intervention; and automatically grouping the generated communications-element identifier with a second set of data parameters to create the ATM address.

In a second aspect, the present invention includes a method for automatically generating an ATM address incident to a request from a requestor. The method includes receiving the request, which includes an element identifier corresponding to a network element to be ultimately associated with the ATM address, validating the request, providing a unique identifier that corresponds to the network element, grouping the unique identifier with a set of parameters to create the ATM address without user intervention; and storing the ATM address in a repository. Reports can be generated based on the stored ATM addresses. One or more individuals or entities can be automatically provided with the ATM address incident to their creation, by email for example.

In final illustrative aspect, a system that automatically generates an ATM addresses is provided. The system includes a Graphical User Interface (GUI) for receiving one or more parameters to be used to generate the ATM address and also includes a set of computer-useable instructions embodied on one or more computer-readable media, wherein the computer useable instructions are accessible by the GUI and perform a method for generating the ATM address without user intervention based in part on the one or more parameters.

BRIEF DESCRIPTION OF THE SEVERAL VIEWS OF THE DRAWINGS

The present invention is described in detail below with reference to the attached drawing figures, which are incorporated by reference herein and wherein:

FIG. 4G is an illustrative screen, shot of a GUI component that provides functionality to generate an ATM report by company in accordance with an embodiment of the present invention;

FIG. 4I is an illustrative screen shot of a GUI component that provides functionality to generate an ATM report by order number in accordance with an embodiment of the present invention;

FIG. 4k is an illustrative screen shot of a report produced in accordance with an embodiment of the present invention.

DETAILED DESCRIPTION OF THE INVENTION

Figure 1:
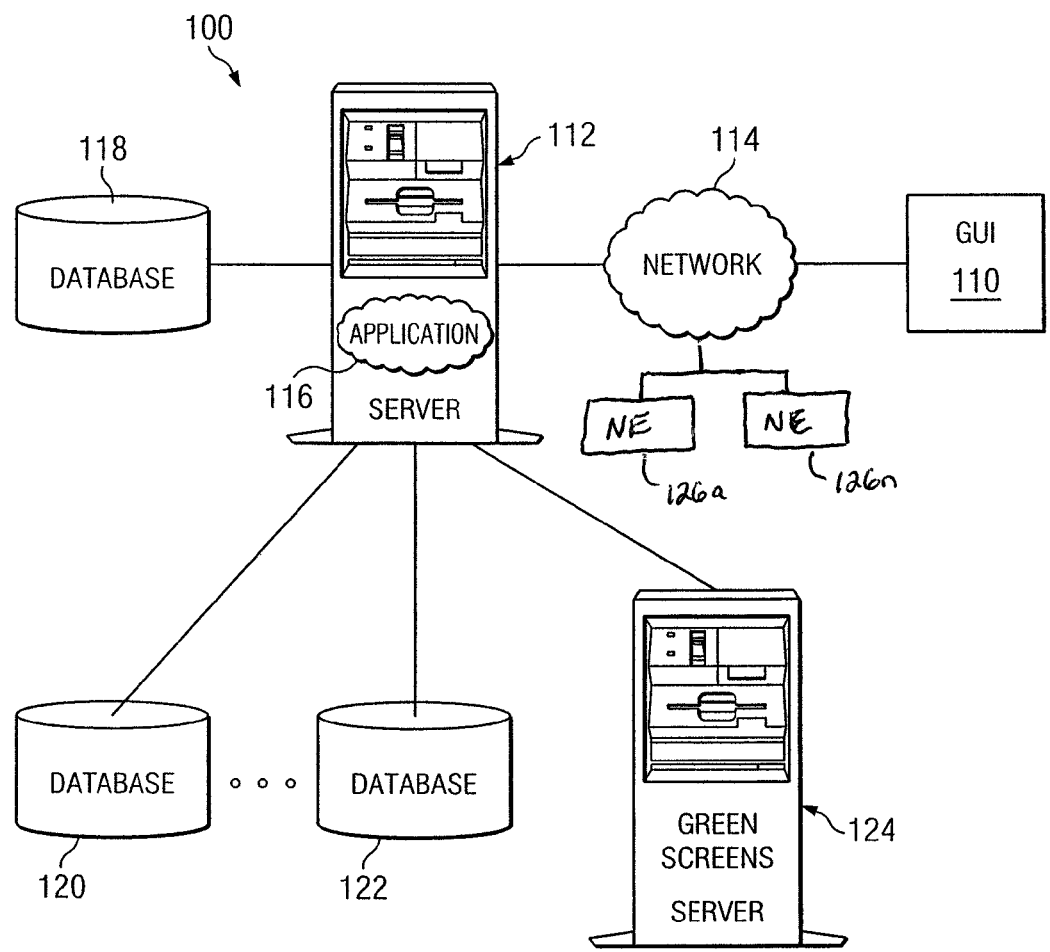
FIG. 1 depicts an exemplary operating environment suitable for practicing an embodiment of the present invention.

The present invention provides a method and system for automatically generating and maintaining ATM addresses. ATM networks are composed of network elements that must have unique ATM addresses. The present invention provides this functionality and much more, such as notification features and report generation. The present invention will be better understood from the detailed description provided below and from the accompanying drawings of various embodiments of the invention. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AESA | Armenian Engineers and Scientists of America |
| AFI | Address Format Indicator |
| ANSI | American National Standards Institute |
| ATM | Asynchronous Transfer Mode |
| CLLI | Common Language Location Identification |
| DCC | Data Country Code |
| DFI | Domain Format Identifier |
| ESI | End System Identifier |
| GUI | Graphical User Interface |
| HTML | Hypertext Markup Language |
| ICD | International Code Designator |
| IEEE | Institute of Electrical and Electronic Engineers |
| ISO | International Organization for Standardization |
| LAN | Local Area Network |
| MAC | Medium Access Control |
| MAN | Metropolitan Area Network |
| ORG ID | Organization Identifier |
| SEL | Selector |
| WAN | Wide Area Network |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Note, the description that follows includes several numerical references to bit or character positions. These numerical references should not be confused with reference numerals that relate the specification to the drawings. All reference numeral are three digits. Most bit- or character-position identifiers are one or two digits, but there are some three-digit references herein. Read in context, the various numerical references should be clear.

To help explain the invention without obscuring its functionality, a preferred embodiment will now be referenced in connection with a communications network. FIG. 1 illustrates an exemplary operating environment suitable for practicing the present invention and is referenced generally by the numeral 100. Operating environment 100 should not be construed as a limitation of the present invention. Additional components that can be used in connection with the present invention are not shown so as to not obscure the present invention. FIG. 1 illustrates an embodiment of the present invention comprising a graphical user interface (GUI) 110 coupled to a server 112 through a network 114. In this embodiment, an application 116 runs on server 112. Server 112 can take on a variety of forms, including a personal computer. An AS400 is an exemplary computing device suitable to be server 112, but other devices will function as well. A database 118 is accessible by server 112, which can retrieve data from other databases as well, illustratively depicted as databases 120 and 122. A second server 124 is can also be provided to optionally make available what is know in the telecommunications art as "green screens."

In a preferred embodiment, GUI 110 is a HTML-based interface. Providing an HTML-based interface allows the present invention to be used in connection with the Internet and makes it accessible from virtually anywhere in the world and by wireless devices. Thus, where an Internet connection is available, the present invention is available. Database 118 houses a litany of data items related to a communications network in a preferred embodiment. Exemplary data housed by database 118 includes an inventory of network elements, such as network elements 126a-126n, network-element identifiers, and other information related to a communications network. In a preferred embodiment, database 118 is also used to store the ATM addresses that will be generated automatically, a process that will be described in greater detail below.

Figure 2:
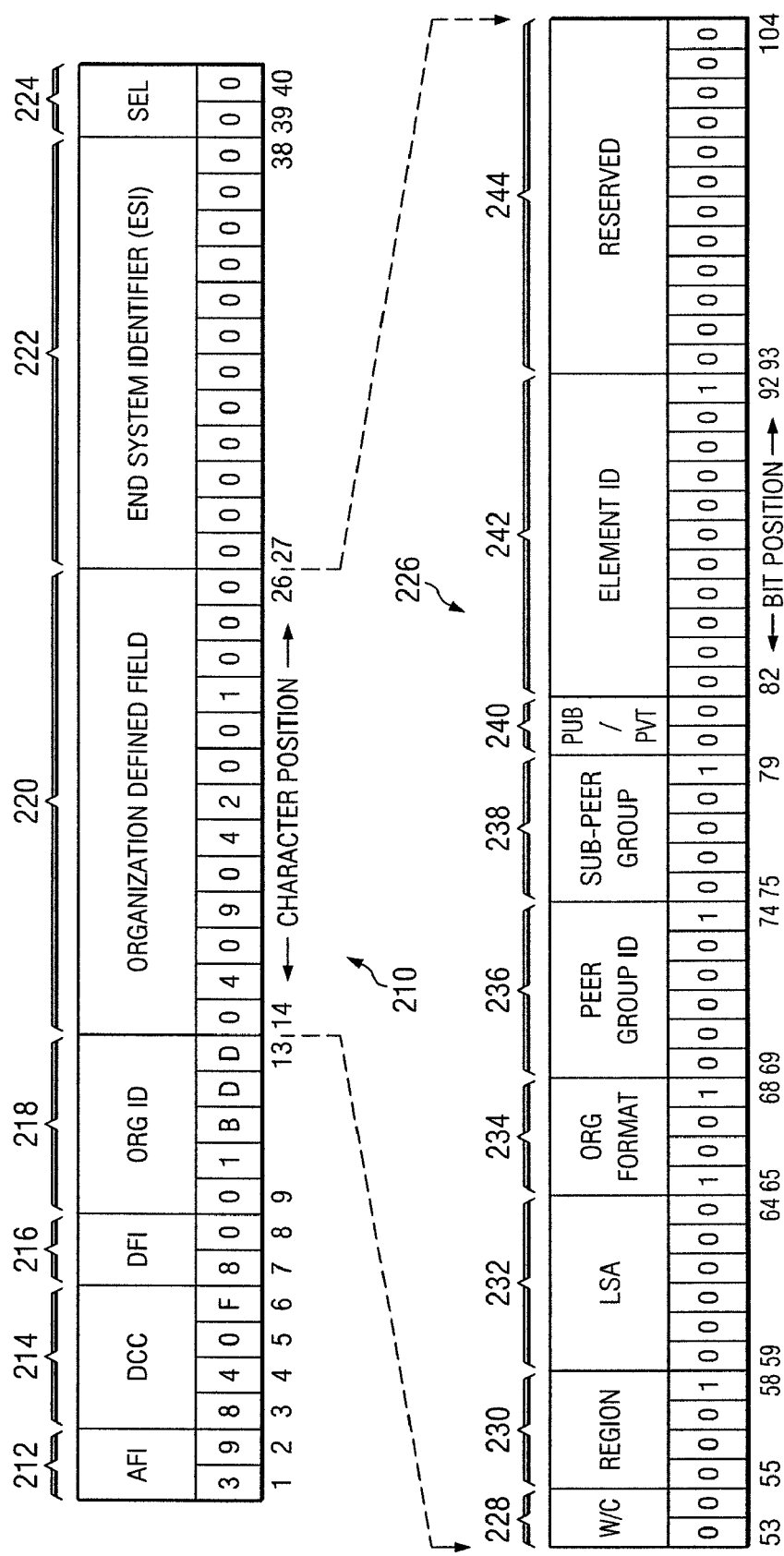
FIG. 2 depicts an illustrative ATM-address format in accordance with an embodiment of the present invention.

An object of the present invention is to automatically generate and maintain ATM addresses. FIG. 2 depicts an illustrative ATM address and is referenced generally by the numeral 210. As shown, ATM address 210 is partitioned into seven fields: an AFI field 212, a DCC field 214, a DFI field 216, an ORG ID field 218, an organization-defined field 220, an ESI field 222, and a selector field 224. The specific partitions shown 212-224 are depicted for illustrative purposes. ATM address 210 may include different partitions from those shown. Moreover, the specific names associated with each of the partitions are provided to facilitate description of the present invention and aid in its understanding. The names and character positions are not mandatory, rather exemplary in nature. Other schemes for segregating an ATM address to suit various purposes are equally applicable to and contemplated within the scope of the present invention.

ATM address 210 includes 160 bits, which translates to 40 hexadecimal characters. An actual ATM address is provided in FIG. 2 for purely illustrative purposes. The illustrative 40-character ATM address is "39840F8001BDD040904200100000000000000000." The character positions of ATM address 210 are also depicted on FIG. 2.

AFI field 212 spans character positions 1 and 2. AFI field 212 is an Address Format Indicator field. In a preferred embodiment, the value of this field determines the type of the AESA (e.g., DCC, ICD, E.164, local, etc.) AFI field 212 also indicates which authority can assign codes (the structure and values of fields) for the rest of the AESA. In this embodiment, AFI field 212 for a DCC formatted AESA is "39."

DCC field 214 spans character positions 3 through 6. DCC field 214 describes a Data Country Code. This value can be assigned by ISO to indicate the country authority. Each country may decide the structures and assigning rules for the fields following the DCC field. The data country code for the United States is "840F." The address registration body in the United States is the American National Standards Institute (ANSI).

DFI field 216 spans character positions 7 and 8. DFI field 216 is a Domain Format Identifier. DFI field 216 allows subsequent fields to be formatted differently depending on its value. Currently, ANSI has only one defined value of "80," but this may change in the future.

ORG ID field 218 spans character positions 9 through 13. ORG ID field 218 is an organization identifier. This value can be assigned by ANSI to indicate that the rest of the addressing space belongs to and is administered by a respective registered organization. Thus, a first company may have a first ORG ID, a second company will have a different ORG ID, etc. This allows flexibility in using the remaining character positions 14 through 40, which is why those shown are illustrative in nature.

Organization-defined field 220 spans character positions 14 through 26 in a preferred embodiment. Organization-defined field 220 is a field whereby the registered organization may use to construct an ATM address scheme specific to their ATM network. Accordingly, various organizations may choose to utilize the organization-defined field in various ways. As will be explained in greater detail below, organization-defined field 220 is used to generate a unique ATM address.

ESI field 222 spans character positions 27 through 38 in a preferred embodiment. ESI field 222 is an End System Identifier. ESI field 222 provides an interface analogous to a Medium Access Control (MAC) address of an Ethernet/IEEE802.3 interface. The value of ESI field 222 may be populated by each end system with codes derived from IEEE assignments, such as MAC addresses, that uniquely identify each interface.

SEL field 224 spans character positions 39 through 40. SEL field 224 is a selector field and is used to differentiate multiple addresses associated with the same interface.

Organization-defined field 220, is not limited to that shown in FIG. 2. Rather, detailed array 226 represents merely an illustrative embodiment of subpartitioning organization-defined field 220. In a preferred embodiment, detailed array 226 spans bits 53 through 104 of ATM address 210. Bits 53 through 54 are populated with binary digits, that translate to the hexadecimal character codes in organization-defined field 220. Thus, the binary string of detailed array 226, when converted to hexadecimal code, translates to "0409042001000." An actual example is provided so as to not obscure the present invention and to ease the description of a preferred embodiment. No actual numbers shown in FIG. 2 are mandatory.

As shown, organization-defined field 220 includes a world and country zone 228 that spans bits 53 through 54; a region code 230 that spans bits 55 through 58; a local service area (LSA) field 232 that spans bits 59 through 64; an organization-format field 234 that spans bits 65 through 68; a peer-group-ID field 236 that spans bits 69 through 74; a sub-peer group field 238 that spans bits 75 through 79; a public/private-identifier field 240 that spans bits 80 through 81; an element-ID field 242 that spans bits 82 through 92; and a reserved field 244 that spans bits 93 through 104. Again, different organizations may include different fields in connection with detailed array 226 without departing from the scope of the present invention.

In a preferred embodiment, bit 53 corresponds to a world-zone identifier. Bit 54 corresponds to a country-code identifier. Thus, a code of "0" may correspond to North America while a code of "1" may correspond to another zone. For the country-code identifier, a code of "0" may correspond to the country of the United States, or a "1" may correspond to another country.

Region field 230 allows a more specific identification of a local region. In a preferred embodiment, region field 230 can be used to more precisely describe a domestic region. Thus, a region code of "001" may correspond to a Northeastern region; a code of "1100" may correspond to a Midwest region; or a code of "1110" may correspond to a Western region. The level of specificity or precision required to designate various regions is variable. That is, if more than 15 regions need to be designated, then an additional bit can be used to designate the regions.

LSA field 232 provides bits to describe a Local Service Area in a preferred embodiment. Local-service-area field 232 can be used to more precisely define a portion of a region. Thus, each region may be broken into local-service areas based upon the location of various equipment devices. Organization-format field 234 identifies a specific division within a company. As will be described in greater detail below, organization-format field 234 can be used to safeguard and validate ATM-address assignments. For instance, it may be desirous to limit those who may request an ATM address to those individuals that are associated with a specific organizational unit of a company or geographic region. That is, the "long distance division" cannot request an ATM address for an element that is associated with only the "wireless division." Similarly, a user in the Western Region is restricted to requesting ATM addresses for elements only in the Western region. The present invention provides both of these functional aspects.

Peer group ID field 236 allows up to 64 peer groups to be defined per region. Sub-peer group field 238 allows additional unique ATM addresses to be generated by providing an additional number of bits that can be manipulated per peer group.

ATM addresses used within a specific carrier's network are often public addresses. But if that carrier's customers desire their own private addresses in their network, then public/private field 240 can be used to so designate the ATM address 210 as being associated with a private device.

Element-identifier field 242 is used to uniquely identify elements of a communications network. Exemplary network elements include switches, routers, point of presence devices, signal-transfer points, repeaters, hubs, and the like. Each element can be given a unique element ID by using element-identifier field 242. Element-identifier field 242 is a generated field that is used to uniquely identify a network element within an ATM addressing scheme, such as the scheme illustrated in FIG. 2. Finally, reserved field 244 represents a sub-partition that can be reserved and set aside for future use.

Figure 3B:
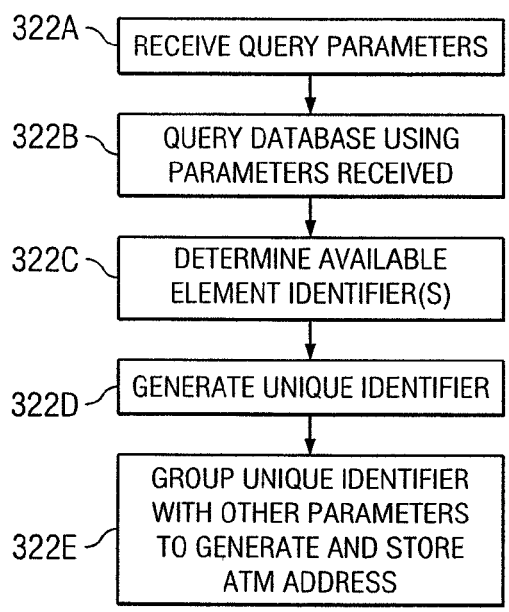
FIG. 3B is flowchart that depicts generating a unique identifier in greater detail.
Figure 3A:
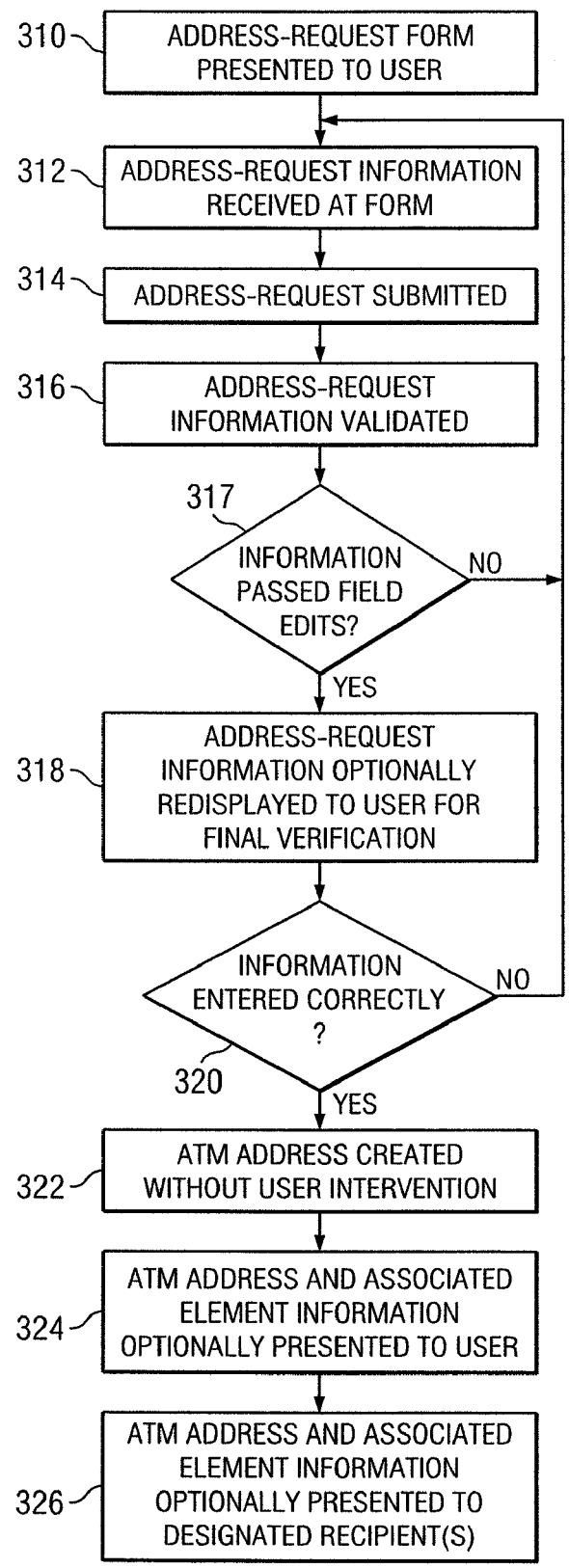
FIG. 3A is a flowchart illustrating an exemplary method for practicing an embodiment of the present invention.

An exemplary computer implemented method for practicing the present invention is provided in FIG. 3A and is referenced generally by the numeral 300. Not all the steps shown in FIG. 3 are required steps and certain steps are not shown so as to not obscure the present invention. Moreover, although some steps are designated as optional steps, those steps not designated as optional steps should not be construed as necessary steps. Rather, the flow diagram of FIG. 3 is provided to illustrate an exemplary method for practicing the present invention. To enhance the understanding of the present invention, the steps of FIG. 3 will be explained in connection with the screen shots of FIGS. 4A through 4K.

Figure 4A:
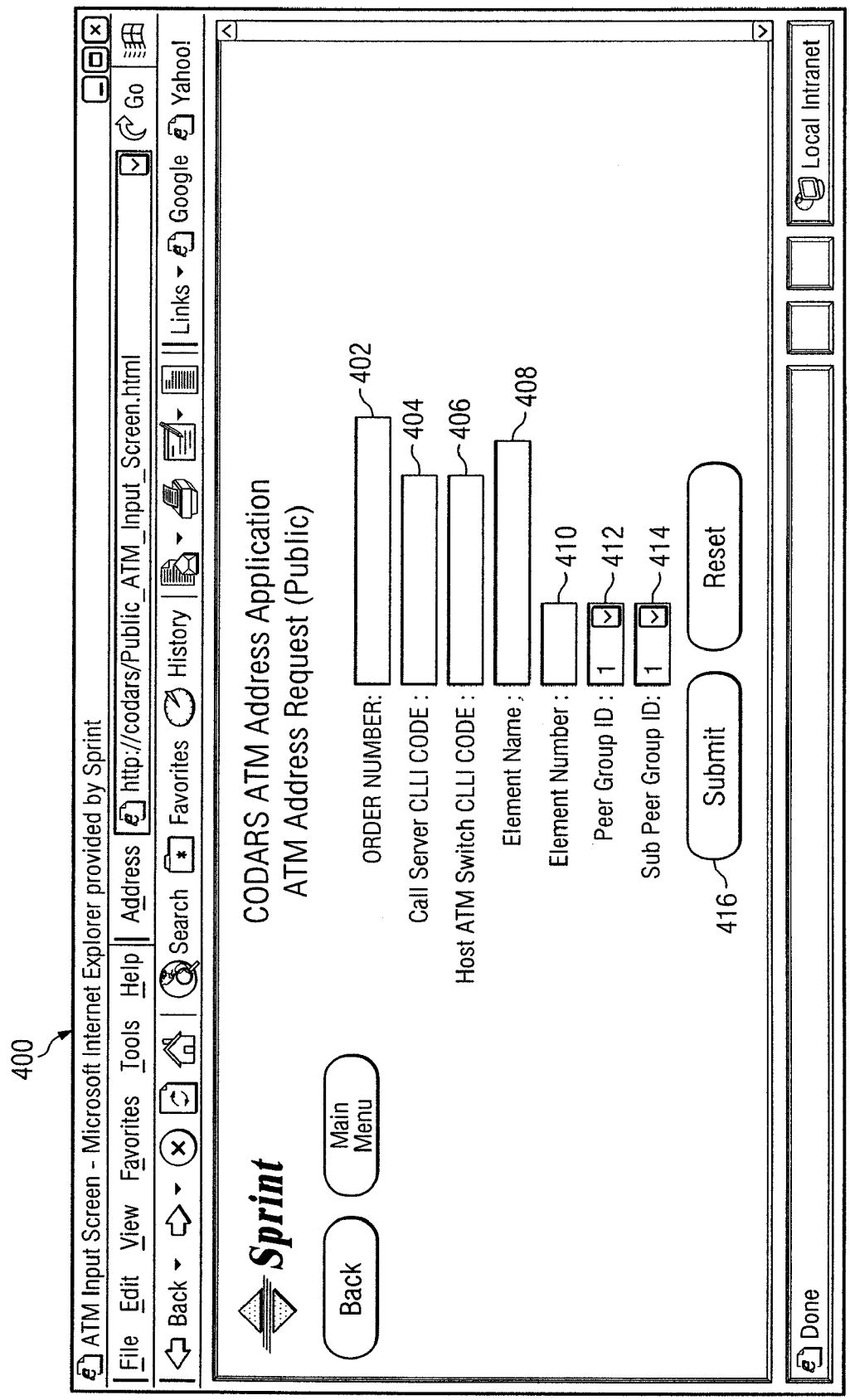
FIG. 4A is an illustrative screen shot of a GUI component to receive parameters to create an ATM address in accordance with an embodiment of the present invention.
Figure 4B:
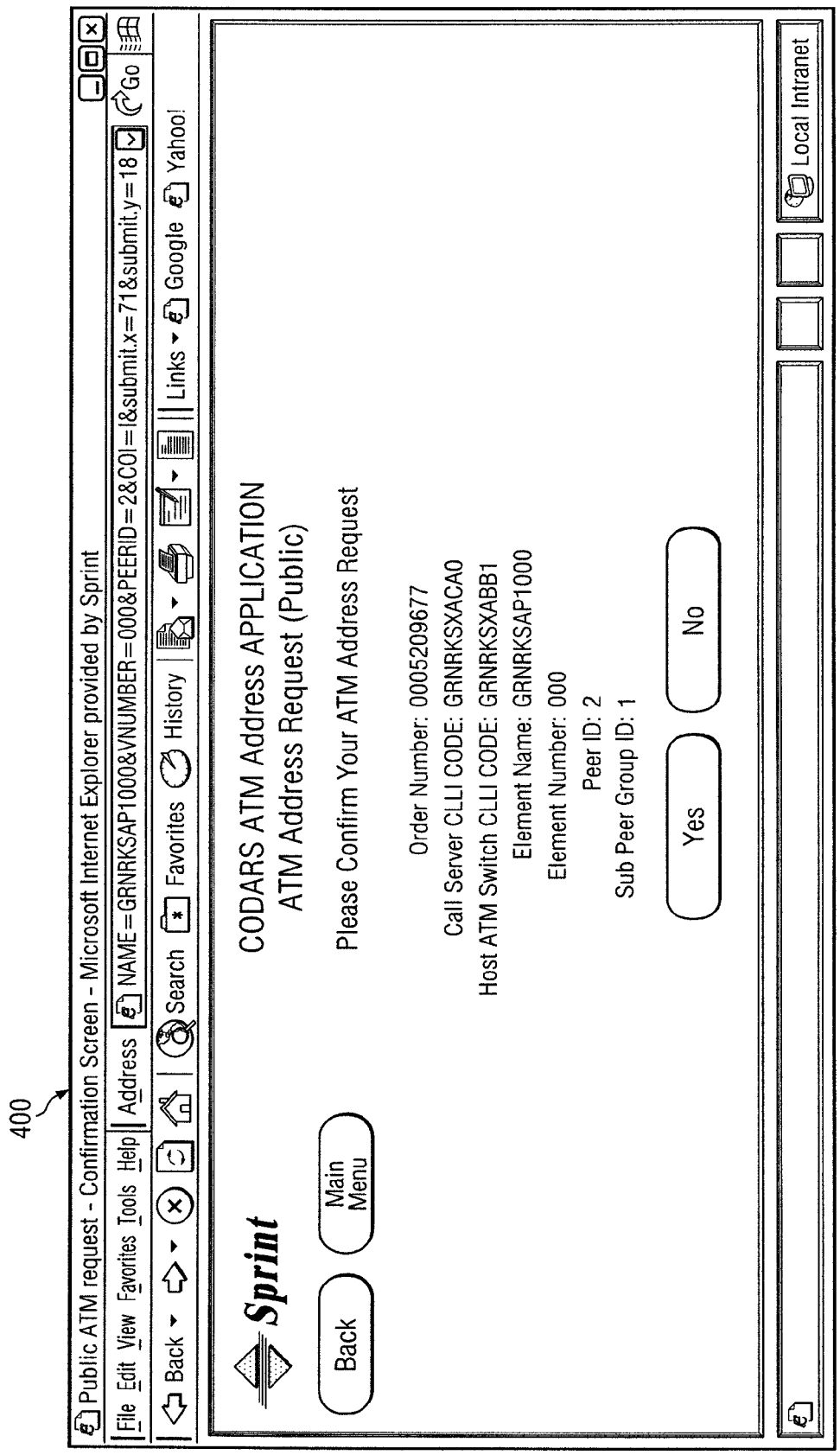
FIG. 4B is an illustrative screen shot of a GUI component that provides confirmation option to a user in accordance with an embodiment of the present invention.

At a step 310A, an address-request form is presented to a user. A screen shot of an exemplary address-request form is depicted in FIG. 4A and referenced by numeral 400. Address-request form 400 includes a set of input components for inputting address-request information. Not all input parameters shown in firm 400 are required. Exemplary input components shown include an order-number field 402. Order-number field 402 can be used to associate an ATM-address request with an identifier. A second textbox 404 is provided to receive a CLLI code associated with a call server. A third textbox 406 can receive a host ATM switch CLLI code in a preferred embodiment. An element-name textbox 408 is included to receive a name associated with the element to which an ATM address will be assigned. Similarly, an element-number textbox 410 receives an element number that will be associated with the element name. A first drop-down box 412 designates a desired peer group and a second drop-down box 414 designates a desired sub-peer group upon which the ATM address should be constructed. The peer-groups and sub-peer groups can also be determined by application 116.

At a step 312, address-request information is received at form 400. At a step 314, the address request is submitted by pressing a submit button 416 on screen 400. At a step 316, the address-request information can be validated. The validation may assume a variety of forms and a variety of levels. At a first level, cursory validation can take place even prior to submitting the address request. Irrespective of a precise order, the present invention offers a greater level of validation than a mere cursory validation. A description of an exemplary validation scheme follows.

In a preferred embodiment, the inputted call server CLLI code 404 is validated to determine whether such a CLLI code exists. If the call server CLLI code entered does not exist, then a respective error message will be conveyed to the user. Also, the host ATM switch CLLI code 406 is also validated. Although the descriptive name "host ATM switch CLLI code" is provided, textbox 406 can be used to receive a CLLI code of any target element. The target element is the element to which an ATM address is to be associated. Thus, if a user wishes to assign an ATM address to a specific network element, then that network element's CLLI code can be entered in box 406.

The CLLI code(s) are validated to ensure that the string entered is the correct length and the correct format. In a preferred embodiment, validation is also performed to ensure that the region selected is valid for the element CLLI entered in textbox 408. Before a user can request an ATM address, he or she logs into the system in a preferred embodiment. Based on the login profile, application 116 can determine whether the user making the request is authorized to make the desired request. Further based on the user's login information, application 116 can determine the region to which the user is associated. If that user attempts to request an ATM address for a network element that is outside of that user's region, then the application 116 can display an appropriate message that such an assignment is not allowed. This validation prevents individuals from say the Western region from inadvertently requesting ATM addresses associated with network elements that lie in the Eastern region for example. This validation is not necessary but helps ensure the integrity of the network by providing an extra safeguard against erroneously assigning ATM addresses.

Thus, in one embodiment, a requester can request ATM addresses only for those elements that lie within the region associated with the requester. Additional validation may also be performed in step 316. With further reference to a log-in profile, application 116 can determine whether the requestor is associated with the proper business unit to submit the request. This validation prevents someone in the "long distance" division from requesting ATM addresses that correspond to elements uniquely associated with the "wireless" division. Other types of validation include validating that the element name is consistent with a prescribed format and/or the element number is within a prescribed range. Those skilled in the art will readily appreciate additional validations that can take place. What is important, is that in some embodiments, a validation scheme is provided. If the information fails validation, then processing reverts to step 312. But if the information provided passes validation, then processing continues to a step 318.

At step 318, the address-request information is optionally redisplayed to the user for final verification. A screen shot of an exemplary verification is provided with reference to FIG. 4B and referenced generally by the numeral 418. A determination is made at a step 320 as to whether the information was entered correctly or not. If the information entered is incorrect, then processing reverts to step 312 and the user is presented again with form 400. If the information is correct, then the ATM address is created without user intervention at a step 322, which will be explained in greater detail with reference to FIG. 3B.

Figure 4C:
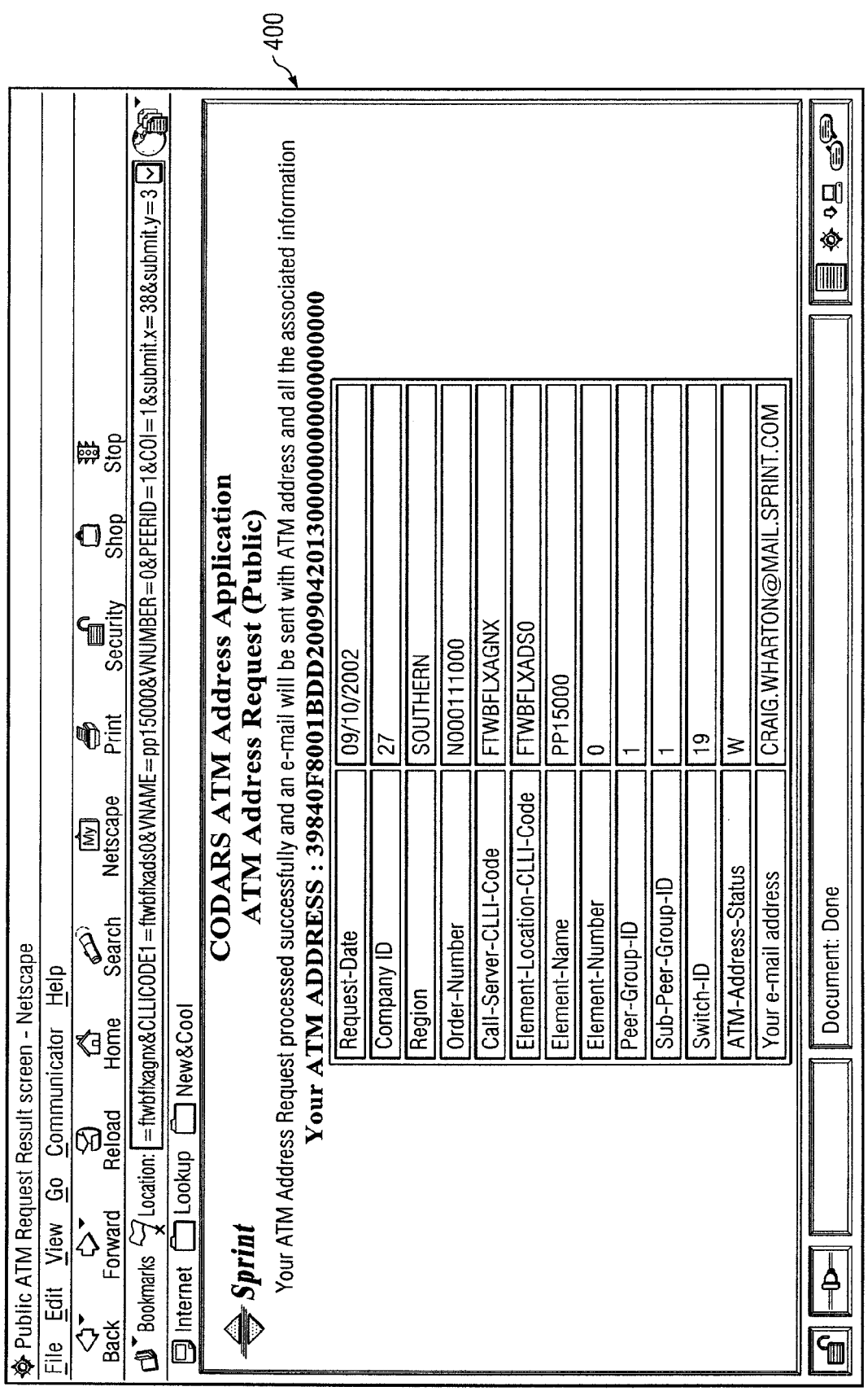
FIG. 4C is an illustrative screen shot of a GUI component that provides an indication of a generated ATM address in accordance with an embodiment of the present invention.

At a step 334, the ATM address and associated element information is optionally presented to the user. A screen shot that depicts an exemplary feedback screen is shown in FIG. 4C and referenced generally by numeral 420. Screen shot 420 indicates the ATM address generated along with the request information submitted by the user. At a step 336, the ATM address and associated element information may optionally be presented to designated recipients. In one embodiment, the presentation mechanism is electronic mail ("email"). That is, the data presented in screen 420 can be sent via e-mail to one or more recipients. One method of communicating the data presented in screen 420 to a designated recipient is to create a spreadsheet with column headings that correspond to the fields in 420 along with the respective data elements. Thus in one embodiment of the present invention, a user may employ a remote device (such as a Palm Pilot or PDA) to access GUI 110 and submit the desired address-request information via form 400 and designate a set of recipients to receive a copy of the ATM address generated.

FIG. 3B is a flow chart that illustrates in greater detail a method according to an embodiment of the present invention for automatically creating and storing an ATM address without user intervention. At a step 322A, the query parameters are received or retrieved as the case may be. Exemplary query parameters include all or a portion of the data items entered via form 400. Other parameters may be any or all fields depicted in FIG. 2. At a step 322B, database 118 is queried using the retrieved or received parameters of step 322A. In other embodiments, the required query parameters are known and simply hard coded, so that querying can be done in a single step. Querying database 118 enables the present invention to determine one or more available element identifiers at a step 322C. The one or more element identifiers correspond to element identifier 242 (see FIG. 2).

At a step 322D, application 116 generates a unique element identifier. A unique element identifier can be generated in a variety of ways. A first exemplary method for generating a unique element identifier is to limit element identifiers to sequential numbers, determine the most recently assigned element identifier, and increment that string by one. This embodiment, however, would limit the number of unique assignments to the number of actual assignments. Thus, in another embodiment, an available element identifier can be identified by a gap in sequential element IDs. That is, if a query returns that element IDs "5, 6, 7, 9, 10" are assigned, then a determination can be made that element identifier "8" is available for assignment. Accordingly, in some embodiments, where an ATM address is deleted, the corresponding element identifier is available for reassignment.

At a step 322E, the generated unique element identifier is combined with the address-request information to create organization-defined field 220, which is also combined with the other fields listed in FIG. 2 to generate ATM address 210 without user intervention. The final ATM address is stored in database 118. One method of storing the information in database 118 is to insert a new row into database 118 corresponding to ATM address 210. By restricting database 118 to not allow duplicate entries, inserting a new row into database 118 further ensures that the ATM address generated is a unique ATM address. After passing this final confirmation that the ATM address is a unique address, the confirmation screen shot 420 of FIG. 4C can be presented to a user.

The present invention automatically generates and stores the ATM address in database 118. This prevents duplicate ATM addresses from being assigned and does away with the painstaking task of formulating a new ATM address that conforms to a prescribed format. A user need only enter a one or more data elements to have the present invention automatically create and store an ATM address to be assigned to a network element. If the data provided by the user does not allow an ATM address to be generated, the present invention can automatically recommend changing one of the manipulatable fields to derive a unique ATM address. For example, screen shot 400 indicates that sub-peer group 1 was selected in drop down box 414. If the user submitted address-request information that would not permit an ATM address to be generated under that sub-peer group, then the present invention could generate an ATM address based on a different sub-peer group, notify the user of such change and either wait for confirmation or automatically generate the new address based on, say a different peer group ID.

Figure 4D:
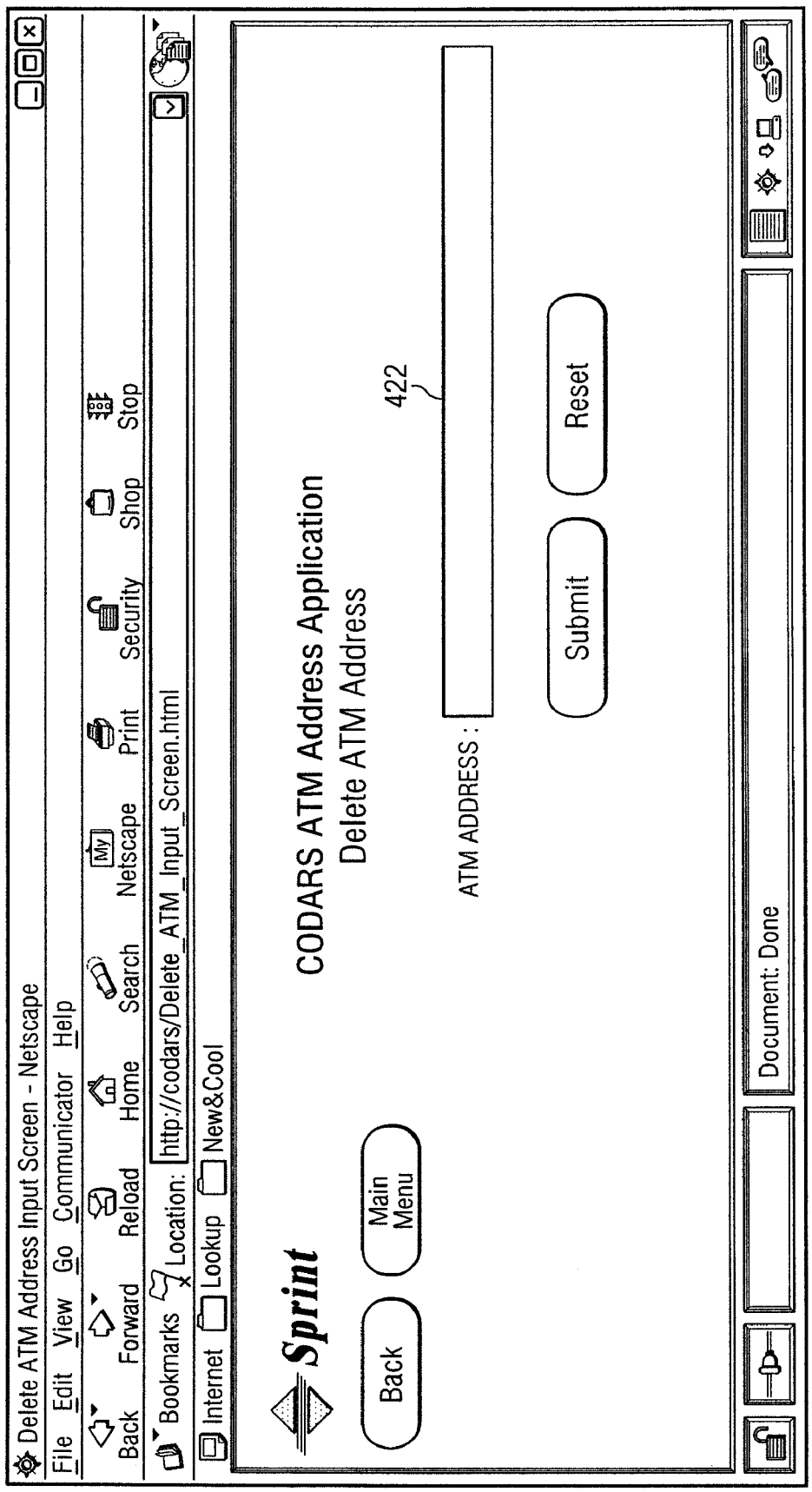
FIG. 4D is an illustrative screen shot of a GUI component that provides the ability to delete an ATM address in accordance with an embodiment of the present invention.

FIG. 4D is a screen shot of an illustrative interface for deleting an ATM address. A user is prompted to enter the ATM address to be deleted in textbox 422. In alternative embodiments, the present invention can return a list of currently assigned ATM addresses and allow the user to select an ATM address to be deleted. A screen shot can be provided back to the user incident to submitting a delete request so that the user can verify that the desired ATM address was properly deleted. In some embodiments, the deleted ATM address will be available for reassignment as previously mentioned. In other embodiments, the deleted ATM address will be retained for historical purposes.

Figure 4E:
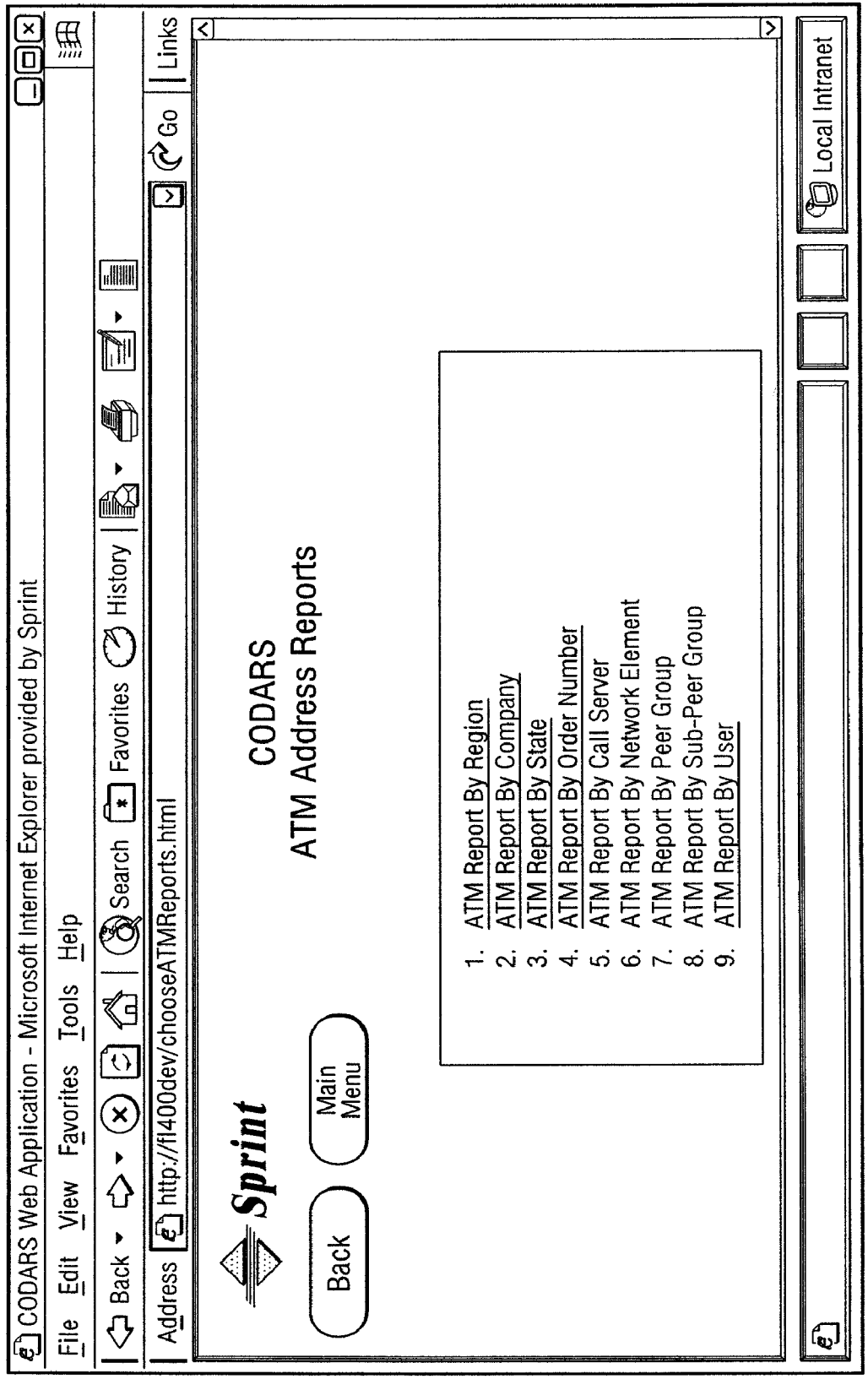
FIG. 4E is an illustrative screen shot of a GUI component that provides functionality to generate a plurality of reports based on stored ATM addresses in accordance with an embodiment of the present invention.

FIG. 4E is a screen shot that indicates illustrative reports that can be generated in accordance with an embodiment of the present invention. As shown, the following ATM reports can be generated: by region, by company, by state, by order number, by call server, by network element, by peer group, by sub-peer group, or by user. Those skilled in the art will appreciate that alternative reports can also be generated and the generation of such reports will not depart from the scope of the present invention.

Figure 4F:
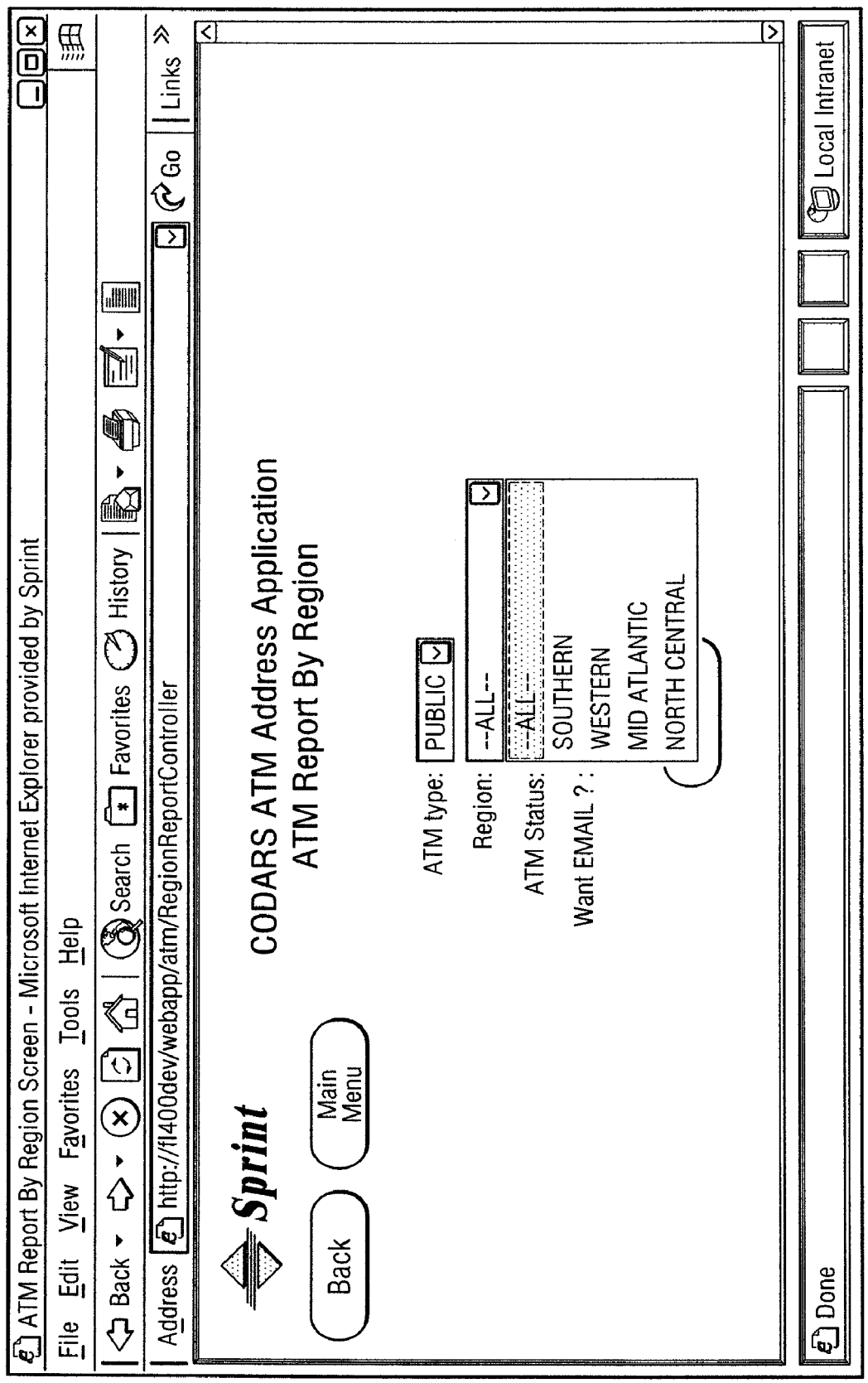
FIG. 4F is an illustrative screen shot of a GUI component that provides functionality to generate an ATM report by region in accordance with an embodiment of the present invention.

FIG. 4F depicts an illustrative interface for generating an ATM report by region. As shown, a user can select an ATM type, a region, an ATM status, and an indication of a target e-mail address. The level of detail of results returned will be commensurate with the amount of information provided in the interface shown in FIG. 4F.

Figure 4G:
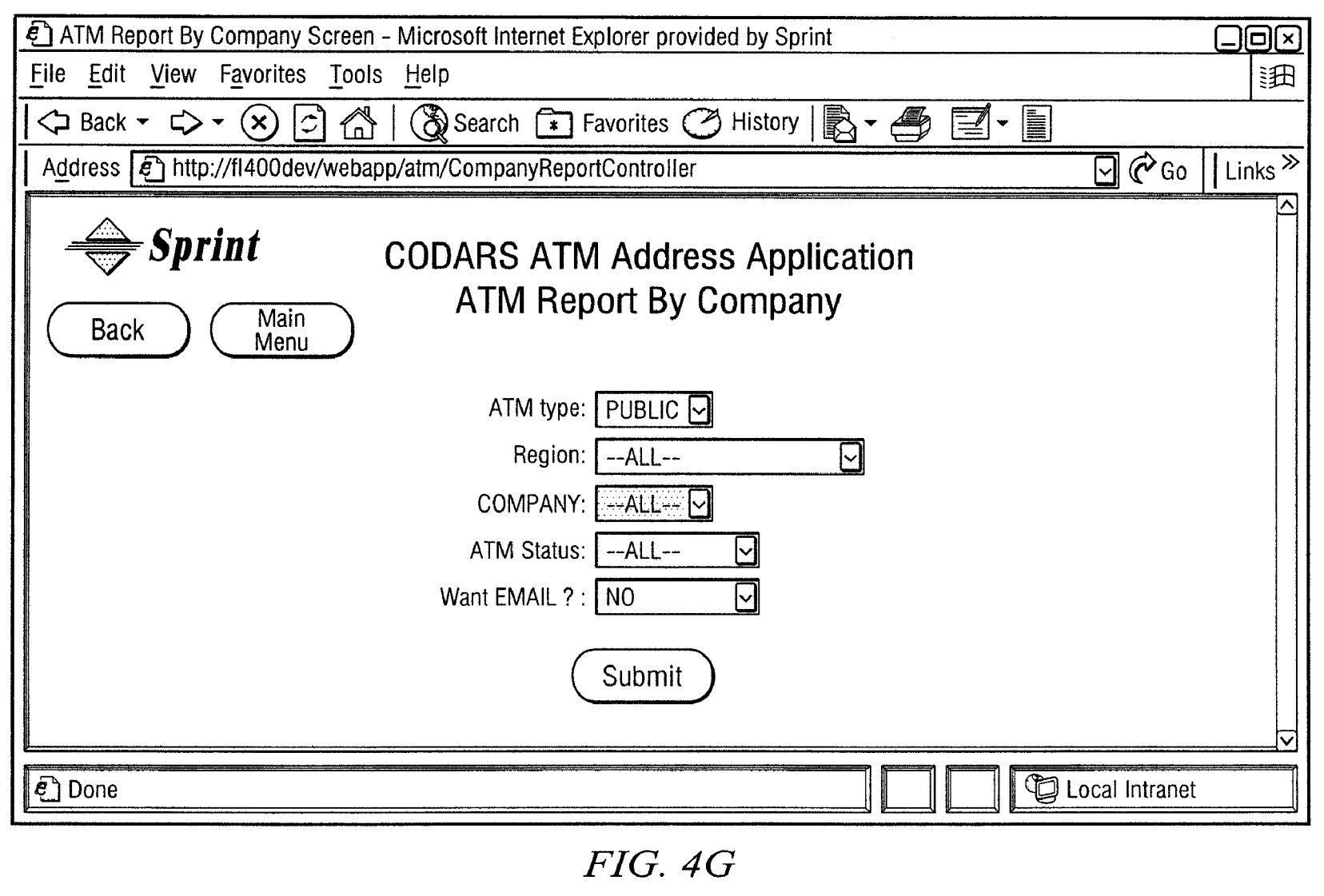

FIG. 4G depicts an illustrative interface for generating an ATM report by company. As shown, a user may enter an ATM type, a region, a company, an ATM status, and an indication of whether or not they wish to view the corresponding e-mail address. Such reporting ability is very beneficial in that it provides the ability to quickly gather information related to the various ATM addresses of a communications network.

Figure 4H:
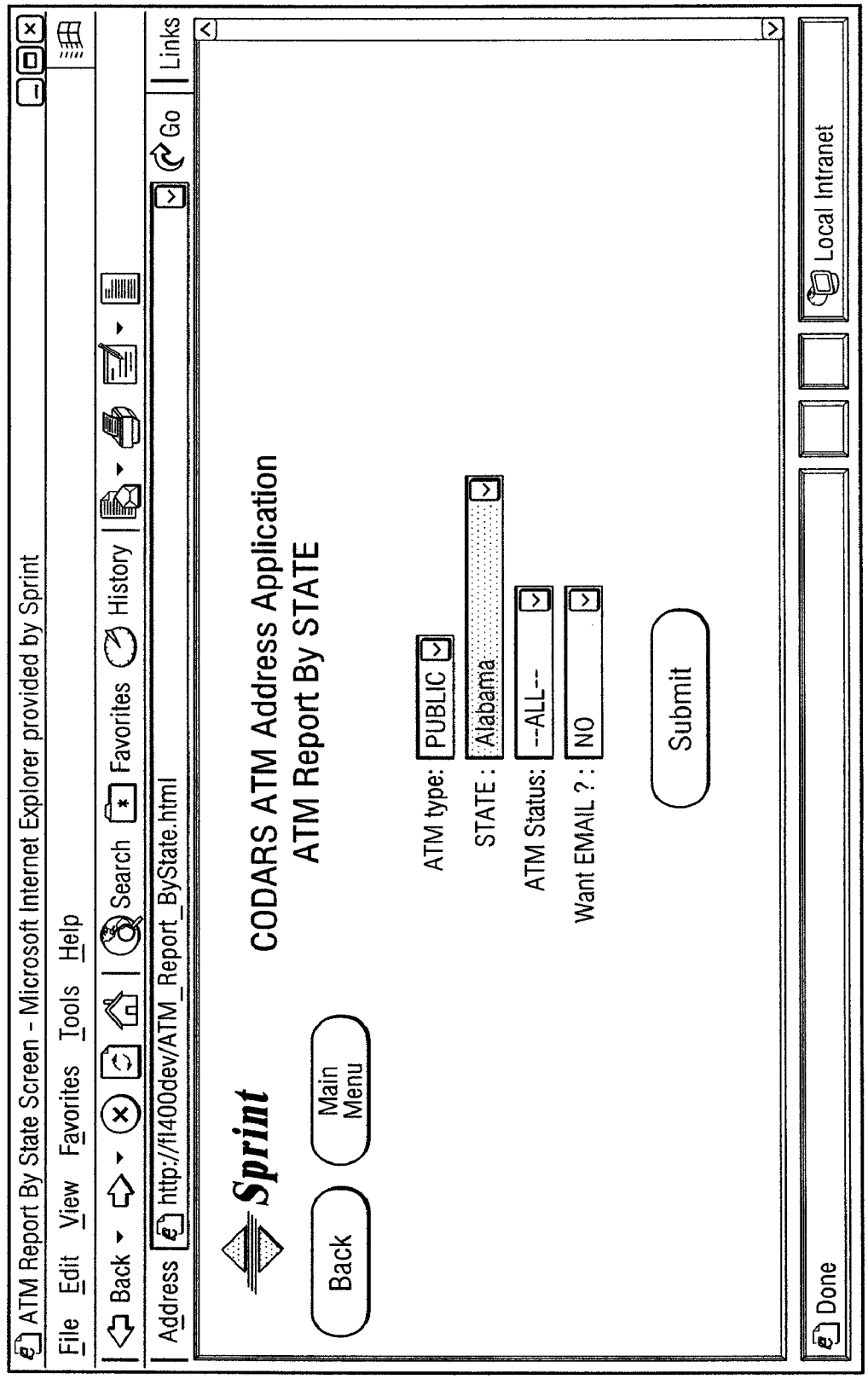
FIG. 4H is an illustrative screen shot of a GUI component that provides functionality to generate an ATM report by state in accordance with an embodiment of the present invention.

FIG. 4H depicts an illustrative interface for generating an ATM report by state. As shown, a user may indicate an ATM type, a state, an ATM status, and whether the user wishes to view any corresponding e-mails. This report would allow an individual to view all of the ATM address assignments that have been associated with elements of a specific state.

FIG. 4I depicts an illustrative interface for generating an ATM report by order number. As shown, a user may enter the ATM type, a region, a company, an order number, an ATM status, and whether or not e-mails are to be returned. This report allows quick display of all ATM addresses associated with a specific order number.

Figure 4J:
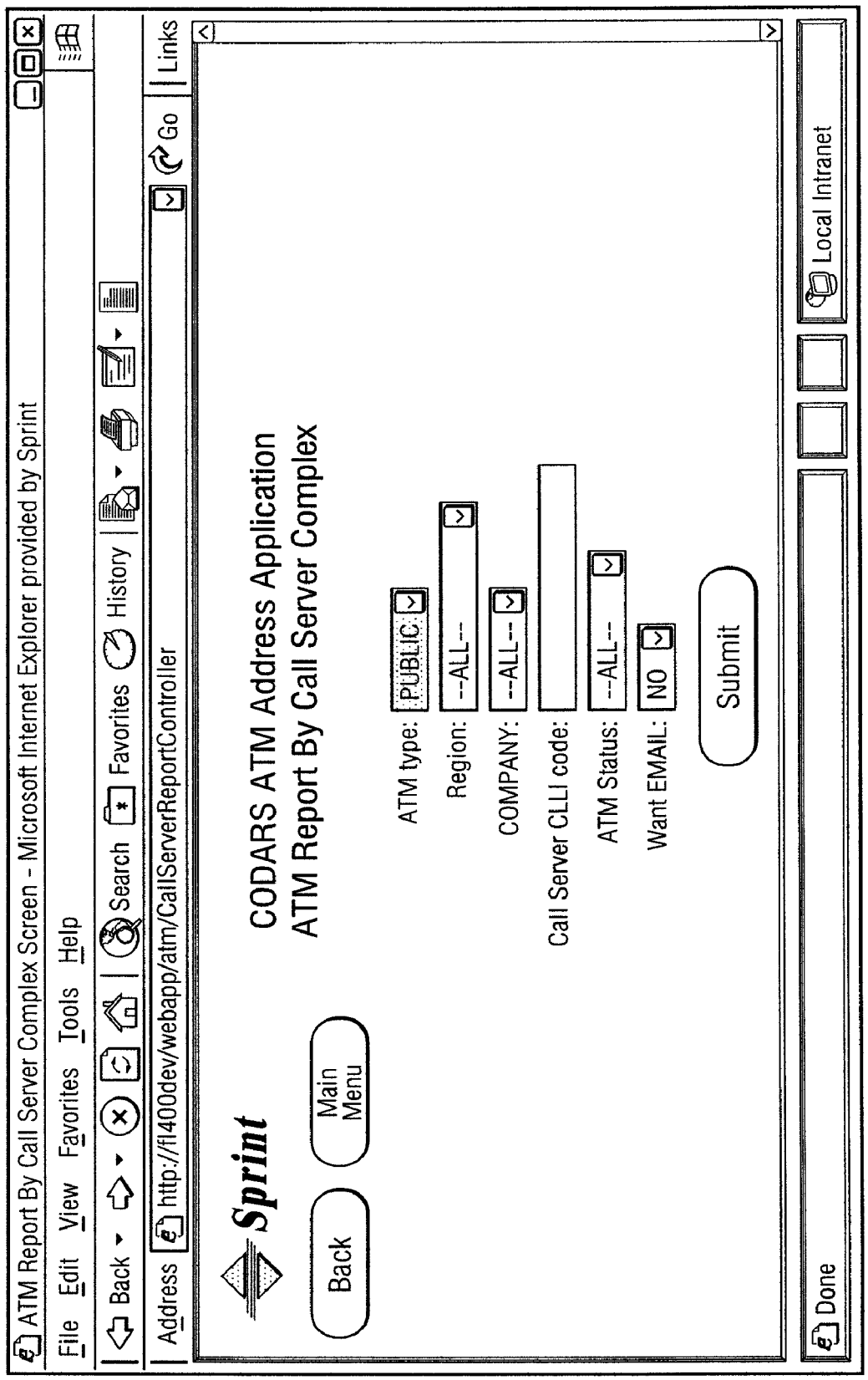
FIG. 4J is an illustrative screen shot of a GUI component that provides functionality to generate an ATM report by an element identifier in accordance with an embodiment of the present invention.

FIG. 4J depicts an illustrative interface for generating an ATM report by call server complex. As shown, a user may indicate an ATM type, a region, a company, an element identifier, an ATM status, and an indication as to whether e-mails are to be returned. This report presents a listing of ATM addresses by call server, (or by any other element identifier). Similarly interfaces can be used to generate reports by network element, peer group, sub-peer group, by user, or by any other variable that is desired.

FIG. 4K provides a screen shot of an illustrative ATM address report. Reports can be used for quality control, tracking purposes, troubleshooting, or a litany of other ways.

As can be seen, the present invention and its equivalents are well adapted to providing a method and system for automatically generating and maintaining ATM addresses to be assigned to elements of a communications network. The present invention ensures that an ATM address is uniquely assigned. That is, no two elements of a network will have the same ATM address. The ATM addresses are automatically stored in a database, whereby fruitful reports can be run to gather desired data. Thus, the ATM addresses are automatically maintained, whereby they can be deleted or viewed. The present invention offers a centralized source where ATM address assignments can be stored and referenced. Validation along with security and privilege information is integrated to further reduce the likelihood of erroneous ATM-address generation and ATM-address assignment. The present invention also allows notifications to be automatically provided to one or more recipients in a variety of ways, such as e-mail. Many different arrangements of the various components depicted, as well as components not shown, are possible without departing from the spirit and scope of the present invention. Those skilled in the art will appreciate the litany of additional network components that can be used in connection with the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. One or more computer-readable storage media having computer-useable instructions embodied thereon to be processed by a computing device and to perform a method for generating an Asynchronous Transfer Mode (ATM) address, the method comprising:

receiving a first set of data parameters, wherein the first set of data parameters includes an element identifier corresponding to a network element that is to receive the ATM address;

querying a database based on the first set of data parameters that enables a unique communications-element identifier to be generated;

determining one or more element identifiers available for assignment based upon the querying of the database, wherein determining the one or more element identifiers includes determining the most recently assigned element identifier;

generating the unique communications-element identifier from the one or more element identifiers available for assignment without user intervention, wherein generating the unique communications-element identifier includes incrementing the determined most recently assigned element identifier; and automatically grouping the generated communications-element identifier with a second set of data parameters to create the ATM address; and storing the ATM address in a database.

2. The media of claim 1, wherein generating the unique communications-element identifier includes selecting one of the determined one or more element identifiers available for assignment.

3. The media of claim 1, wherein the second set of data parameters include one or more selections from the following:

a country code;
a local-service-area code;
an organization format;
a peer-group identifier;
a sub-peer-group identifier;
an indication as to whether the ATM address is to be public or private;
an address-format indicator;
a data country code;
an organization identifier; and/or
an end-system identifier.

4. The media of claim 1, further comprising computer-useable instructions embodied thereon that, when processed by the computing device, perform the method of:

presenting a graphical user interface to a user to enable the user to input the data parameters, the data parameters including address-request information that is used to determine the one or more element identifiers available for assignment.

5. The media of claim 1, wherein determining one or more element identifiers available for assignment includes identifying an element identifier that was previously part of another ATM address that has been deleted.

6. A method for automatically generating an ATM address incident to a request from a requestor, the method comprising:
   receiving the request at a server, wherein the request includes an element identifier corresponding to a network element to be ultimately associated with the ATM address;
   validating the request by the server, wherein validating the request includes determining whether the requestor has authority to submit the request, wherein determining whether the requestor has authority to submit the request includes—
      retrieving information related to the requestor from a log-in profile of the requestor; and
      determining from the log-in profile whether the requestor has the requisite authority to submit the request;
   determining one or more element identifiers available for assignment by the server;
   generating, by the server, a unique identifier that corresponds to the network element from the one or more element identifiers available for assignment;
   grouping, by the server, the unique identifier with a set of parameters to create the ATM address without user intervention; and
   storing the ATM address in a database.

7. The method of claim 6, wherein the request from the requestor is received through a graphical user interface.

8. The method of claim 6, wherein validating the request further includes determining whether the element identifier provided actually corresponds to a network element.

9. The method of claim 6, wherein validating the request further includes determining whether the requester is associated with an organizational unit authorized to make the request.

10. The method of claim 6, wherein the set of parameters include a set of hexadecimal characters that complete the ATM address.

11. The method of claim 6, further comprising generating reports based on the ATM addresses stored in the database.

12. The method of claim 6, further comprising automatically notifying one or more recipients of the generated ATM address.

13. The, method of claim 6, further comprising generating an alternative ATM address if a desired ATM address is unavailable.

14. A method for automatically generating an ATM address incident to a request from a requestor, the method comprising:
   receiving the request at a server, wherein the request includes an element identifier corresponding to a network element to be ultimately associated with the ATM address;
   validating the request by the server, wherein validating the request further includes determining whether the network element to be associated with the ATM address lies in the proper geographic area to receive the ATM address, wherein determining whether the network element to be associated with the ATM address lies in the proper geographic area comprises—
      gathering information from a log-in profile associated with the requestor; and
      determining from the gathered information whether the requestor is authorized to request an ATM address for network elements that lie in a certain geographic region;
   determining one or more element identifiers available for assignment by the server;
   generating, by the server, a unique identifier that corresponds to the network element from the one or more element identifiers available for assignment;
   grouping, by the server, the unique identifier with a set of parameters to create the ATM address without user intervention; and
   storing the ATM address in a database.

* * * * *